May 17, 1960 G. B. GREENE 2,936,957

CALCULATING MACHINES

Filed Jan. 30, 1956 3 Sheets-Sheet 1

INVENTOR.
George B. Greene.
BY
Robert W. Hampton

May 17, 1960 G. B. GREENE 2,936,957

CALCULATING MACHINES

Filed Jan. 30, 1956 3 Sheets-Sheet 2

INVENTOR.
George B. Greene

BY

Robert W. Hampton

CALCULATING MACHINES

Filed Jan. 30, 1956 3 Sheets-Sheet 3

INVENTOR.
George B. Greene.
BY
Robert W. Hampton 2,936,957
Patented May 17, 1960

2,936,957

CALCULATING MACHINES

George B. Greene, Berkeley, Calif., assignor to Smith-Corona Marchant Inc., a corporation of New York Application January 30, 1956, Serial No. 562,272
6 Claims. (Cl. 235—167)

This invention relates to electronic digital computers and more particularly to arithmetic units for use in such computers. It is especially concerned with arithmetic units having particular utility in small-scale electronic digital computers.

The arithmetic operations performed by this invention include addition, subtraction, and multiplication. The invention comprises an arithmetic unit including three simple, low-cost, compact recirculation memories of the type fully disclosed in the co-pending application Serial No. 413,388, filed March 1, 1954, by White and Reinholtz, now Patent No. 2,922,144, and a simple control system. The magnetic disc recirculation memories receive and store multidigit binary numbers, hereinafter called "words," and subsequently perform, in conjunction with the other basic elements, arithmetic operations using the stored words as operands. One of the recirculation memories is employed for registering on its magnetic storage disc the result of the arithmetic operation.

It is therefore a primary object of this invention to provide an improved arithmetic unit.

Other objects are:

To provide an improved adding circuit;

To provide an improved subtracting circuit;

To provide an improved multiplying circuit;

To provide an arithmetic unit of low cost and of compact construction;

To incorporate small-size, low-cost, magnetic disc recirculation memories into an arithmetic unit;

To provide an accumulator comprising a recirculation memory and a single trigger circuit;

To store each of a plurality of arithmetic operands in a respective recirculation memory; to combine said operands according to a manually-selected rule of arithmetic operation; and to store the result of such arithmetic operation in a recirculation memory; and To manually control the arithmetic combination of a plurality of operands, each stored in a respective recirculation memory, and to store the result of such arithmetic combination in a recirculation memory.

Other objects of the invention will appear from the following description in which reference is made to the accompanying drawings, wherein:

Fig. 9 is a block diagram of a preferred embodiment of an arithmetic unit for performing addition, subtraction, and multiplication in the binary system.

A detailed description of the operation of the arithmetic unit as it performs binary addition, subtraction, and multiplication will be given following descriptions of the various circuit elements which are employed in the present invention.

CIRCUIT ELEMENTS

*Trigger circuit*

One of the elements employed in the present invention is a circuit having two states of operation such, for example, as the well-known Eccles-Jordan vacuum tube trigger circuit, described in Theory and Application of Electron Tubes by H. J. Reich, New York: McGraw-Hill Company.

In elementary form, such a trigger circuit comprises a pair of triode vacuum tubes having a bias arrangement common to both tubes, and having grid-to-anode resistive cross-coupling. The value of a trigger circuit derives from the fact that the circuit has two stable states of equilibrium, viz: when either tube is conducting and the other tube is cut off. The circuit may be caused to trigger abduptly from one stable state to the other by the application of proper control potentials to one or more electrodes. In each state of circuit equilibrium, there is a respective stable set of circuit currents; therefore, at the anode of each tube there are two possible potential levels, namely, a relatively low potential if a tube is conducting and a relatively high potential when the tube is cut off. In the present invention, this difference in potential level is used for controlling gating circuits.

Figure 1:
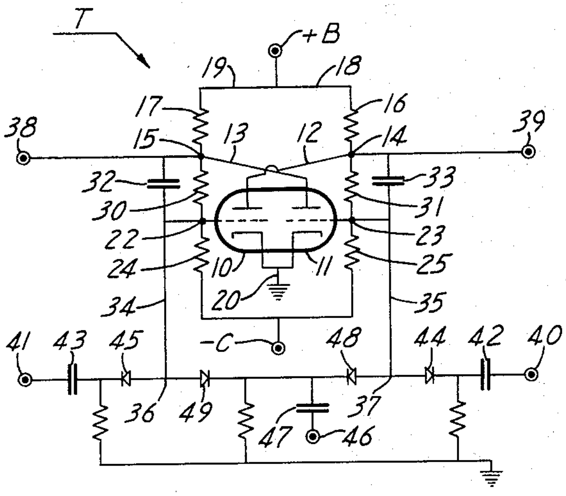
Fig. 1 is a schematic diagram of a typical trigger circuit.

A modified Eccles-Jordan trigger circuit, as employed in this invention, is shown as T in Fig. 1. Since the trigger circuit is a two-state device and is used as an element in a binary arithmetic organ, it is convenient to distinguish the two stable states of the circuit in terms of binary representations. Thus, when the lefthand tube 10 is conducting, the trigger circuit is said to represent a binary "0" and when the right hand tube 11 is conducting, the trigger circuit is said to represent a binary 1. Accordingly, the lefthand tube 10 is hereinafter designated "the "0 side," and the trigger is said to be "reset" when the 0 side is conducting; the righthand tube 11 is hereinafter designated the "1 side," and the trigger is said to be "set" when the 1 side is conducting.

The anode of the 0 side of the trigger is connected by a lead 12, a junction 14, a resistor 16, and a lead 18 to a terminal +B which is a source of positive potential. Similarly, the anode of the 1 side of the trigger is connected by a lead 13, a junction 15, a resistor 17, and a lead 19 to terminal +B. The cathodes of both sides are connected by a common cathode lead 20 to ground.

The grid of the 0 side, hereinafter designated the "0 grid," is connected through a junction 22 and a resistor 24 to a terminal −C which is a source of negative potential. The grid of the 1 side, hereinafter designated the "1 grid," is similarly connected through a junction 23 and a resistor 25 to the terminal −C. The 0 grid is also connected through junction 22, a resistor 30 in parallel with a capacitor 32, junction 15, and lead 13, to the 1 anode. The 1 grid is similarly connected through junction 23, a resistor 31 in parallel with a capacitor 33, junction 14, and lead 12 to the 0 anode.

A "set" input terminal 41 is connected through a capacitor 43, a diode 45, a junction 36, a lead 34 and junction 22 to the 0 grid. Likewise, a "reset" input terminal 40 is connected through a capacitor 42, a diode 44, a junction 37, a lead 35 and junction 23 to the 1 grid. A symmetrical input terminal 46 is connected to both the 0 and 1 grids and through a capacitor 47, a pair of diodes 49 and 48, junctions 36 and 37, and junctions 22 and 23, respectively.

If a negative pulse is applied to the symmetrical input terminal 46, it causes the circuit to trigger from one state of equilibrium to the other. Assuming that the 0 side is initially conducting, a negative pulse applied to terminal 46 is transmitted through diode 48 to the 1 grid, but since the 1 side is already cut off, the pulse has no effect. However, the same negative pulse is transmitted through diode 49 to the 0 grid causing a decrease in the potential at the 0 grid, and thereby causing the conduction of the 0 side to decrease. Consequently, the potential at junction 14 rises, and this rise in potential is coupled by capacitor 33 and resistor 31 to the 1 grid to initiate conduction in the 1 side. The conduction of the 1 side lowers the potential at junction 15. This fall in potential is coupled by capacitor 32 and resistor 30 to the 0 grid, thereby lowering the 0 grid potential and further reducing the conduction of the 0 side. Conduction increases in the 1 side and decreases in the 0 side until a state of equilibrium is reached with the 1 side fully condcting and the 0 side cut-off. Each subsequent negative pulse applied to terminal 46 similarly reverses conduction from one side to the other.

A negative pulse applied to the set terminal 41 sets the trigger to 1 if it is conducting on the 0 side, but has no effect on the trigger if it is already set to 1. Assuming once again that the trigger is conducting on the 0 side, a negative pulse applied to terminal 41 is coupled by capacitor 43, diode 45, and lead 34 to the 0 grid. Diode 49 blocks this pulse from the 1 grid. The negative pulse on the 0 grid causes conduction to reverse from the 0 side to the 1 side in the manner hereinbefore described. Similarly, a negative pulse applied to the reset terminal 40, resets the trigger to 0 if the trigger is conducting on the 1 side, but has no effect on the trigger if it is already reset to 0.

As previously mentioned, the trigger circuit is adapted to control other devices, such as a gating circuit, by the changing potential levels at junctions 14 and 15. When the trigger stands reset to 0, the potential at junction 15 is relatively high, and the potential at junction 14 is relatively low; the converse is true when the trigger stands set to 1. These potentials are available at a pair of control ouptut terminals 38 and 39, which are connected to junctions 15 and 14, respectively.

Figure 2:
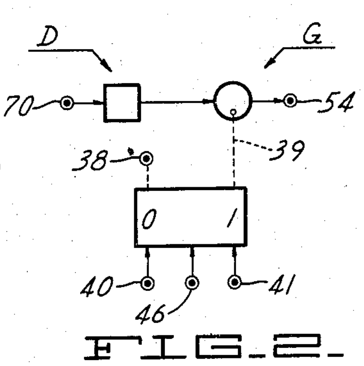
Fig. 2 shows block representations of a trigger circuit, a gate and a delay line.

A block representation of trigger circuit T is shown in Fig. 2 as a rectangle. The symmetrical input terminal 46 is at the bottom center of the rectangle and the reset and set input terminals 40 and 41 are at the bottom left and bottom right of the rectangle, respectively. The control output terminals 38 and 39 are shown at the top left and top right of the rectangle, respectively.

While a vacuum tube type trigger circuit has been shown, it should be realized that other forms of trigger circuits may be employed. For instance, a suitable modification of the ferro-resonant trigger circuit, described in Automatic Digital Calculators by Booth and Booth, published by Butterworths Scientific Publications, London, could be used without departing from the spirit of this invention.

*Gate*

Figure 3:
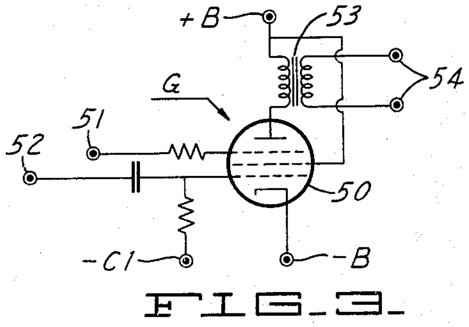
Fig. 3 is a schematic diagram of a typical gate.

A second element employed in the present invention is a gate, an example of which is the well-known pentode gate shown as G in Fig. 3. Gate G comprises a pentode vacuum tube 50 which is normally biased well below cut off by a source of bias potential −C1. The bias of tube 50 can be raised to slightly below cut off by the application of a relatively high potential to an arming terminal 51 which is connected to the suppressor grid of the tube. The gate output is through a transformer 53. The primary winding of the transformer is in the anode circuit of tube 50, and the secondary winding is connected to a pair of output terminals 54.

When a relatively low potential is present at the arming terminal 51, the tube remains biased well below cut off; thus, the gate is said to be "closed," because an interrogating pulse applied to the control grid at terminal 52 produces no output at terminals 54. However, in the event that a relatively high potential is present at the arming terminal 51, the bias of tube 50 is slightly below cut off; thus, the gate is said to be "armed," because, if a positive interrogating pulse is applied to the control grid at terminal 52, tube 50 will conduct and produce an output signal at terminals 54. By proper choice of connection, either positive or negative output pulses may be obtained from the secondary of the output transformer 53 at terminals 54.

In Fig. 2 a gate G is shown as a circle having within it a smaller circle connected to the control output terminal 39 of trigger circuit T. This represents a typical arming connection from a trigger circuit and indicates that gate G is armed when and only when trigger circuit T stands set to 1.

Figure 4:
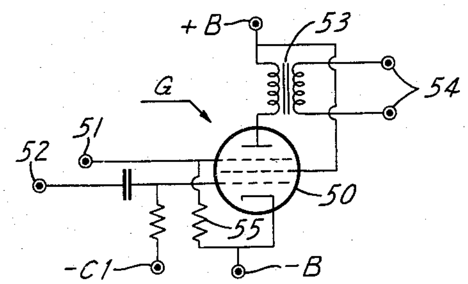
Fig. 4 is a schematic diagram of a modified gate.

Fig. 4 illustrates one modification of the gate shown in Fig. 3. The modification consists of the addition of a resistor 55 connected between the suppressor grid of tube 50 and a low-potential source −B. Thus in the absence of any connection to the arming terminal 51, i.e., if a connection to the arming terminal is open-circuited, the suppressor grid assumes a low potential and effectively closes the gate. This characteristic of the modified gate permits the use of a simplified control unit as described hereinafter.

Although pentode vacuum tube gates have been shown, other types of gates may be used, for instance suitable versions of the diode gates or ferromagnetic gates as described in Automatic Digital Calculators by Booth and Booth, supra.

*Delay line*

Figure 5:
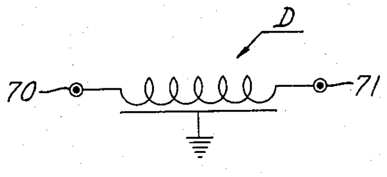
Fig. 5 is the schematic diagram of a typical delay line.

A fourth element employed in the invention is a delay line, a typical example of which is shown schematically in Fig. 5 as a distributed parameter delay line of the type disclosed in Fig. 5 of U.S. Patent No. 2,467,857, issued April 19, 1949, to J. H. Rubel et al., to which reference is made for a full description. Pulses impressed upon an input terminal 70 of the delay line D are delayed a required interval and appear at an output terminal 71. In Fig. 2 a delay line D is shown in block form as a small square.

Although a distributed parameter delay line is shown, other delay circuits, such as well-known lumped parameter delay line, may be employed. In fact, it is often possible to choose circuit components so that necessary delay will result from the time constants associated with the circuit in which case a separate delay element is unnecessary. However, for clarity of explanation delay lines are shown in the accompanying drawings wherever a delay is necessary for the proper operation of the invention.

*Recirculation memory*

Figure 8:
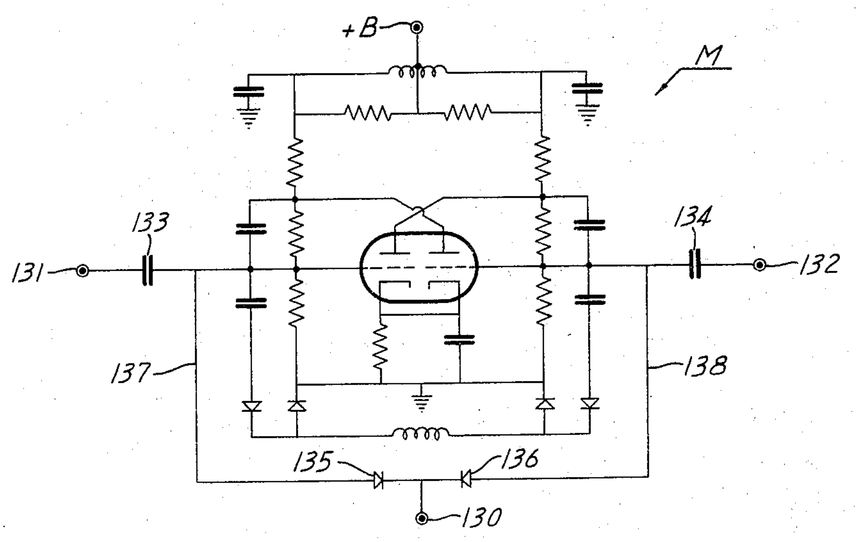
Fig. 8 is a schematic diagram of a recirculation memory as employed in the present invention.
Figure 3:
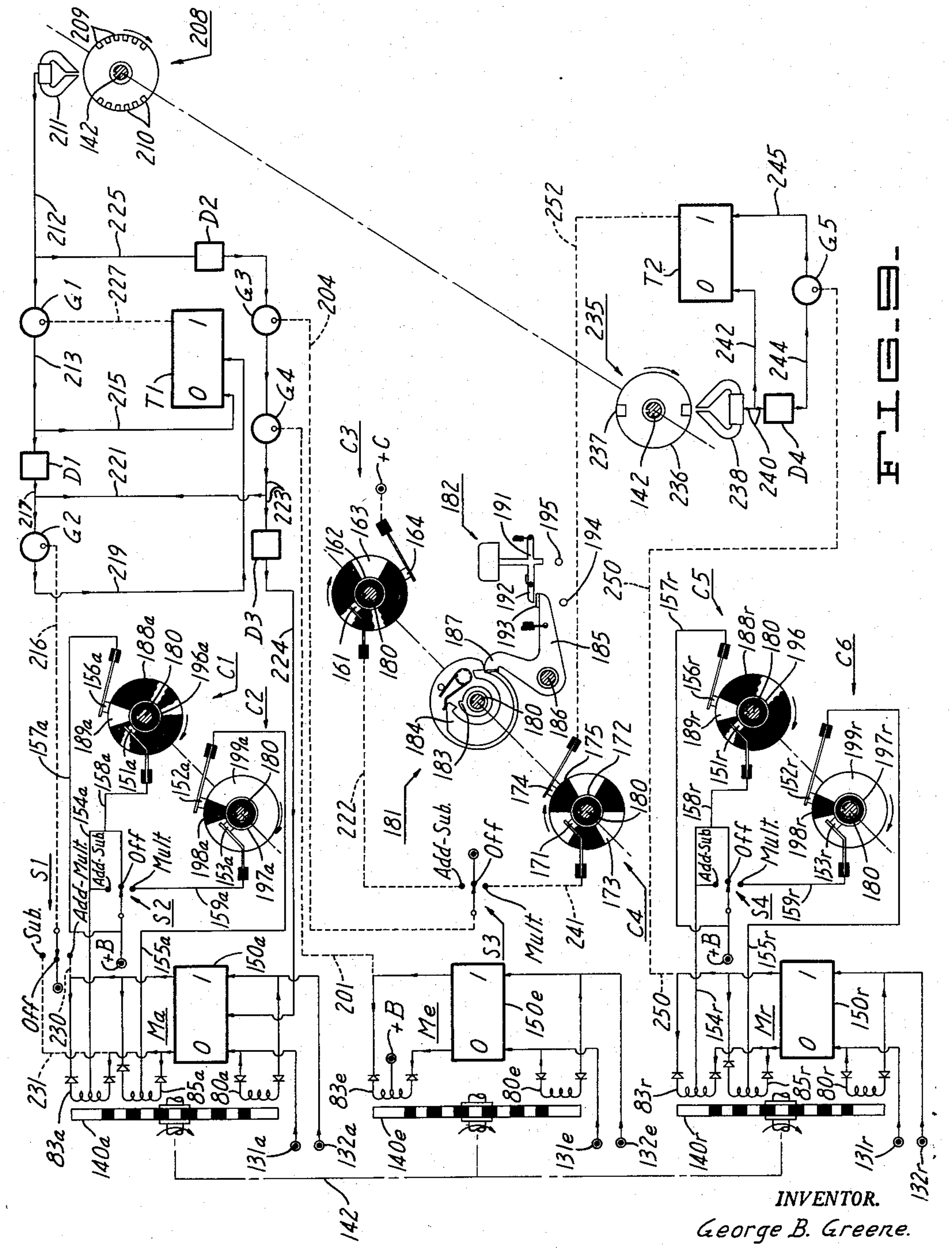

A fifth element employed in this invention is a recirculation memory of the type disclosed by White and Reinholtz in the previously mentioned copending application Serial No. 413,388, filed March 1, 1954. Briefly, a recirculation memory of this type comprises a trigger circuit which receives binary signals from a magnetic reading transducer and transmits these signals to a magnetic writing transducer where they are rewritten. To adapt the White invention for use in the present invention, symmetrical and asymmetrical inputs are added to the trigger circuit. Fig. 8 shows the complete circuit M with the necessary additions: a pair of asymmetrical input terminals 131 and 132 with respective coupling capacitors 133 and 134; a symmetrical input terminal 130;

a pair of diodes 135 and 136 to mutually isolate the grids and to limit symmetrical response of the bistable circuit to negative pulses applied to terminal 130; and a pair of leads 137 and 138 connecting terminal 130 to the grids.

Illustrated in Fig. 7, a recirculation memory as embodied in the present invention comprises a magnetic medium in the form of two diametrically positioned groups 141 and 149 of magnetizable segments, hereinafter called "islands," embedded along the periphery of a disc 140 which is constructed preferably of nonmagnetic material. A reading transducer 80 includes a core 143 having a gap 144 disposed in cooperative relation with disc 140. A winding 145 on core 143 is connected by a pair of leads 116 and 126 to the 0 and 1 inputs, respectively, of a bistable circuit 150 which may be of the type shown in Fig. 1. A writing transducer 83 includes a core 146 having a gap 147 disposed in cooperative relation with disc 140. A center-tapped winding 148 on core 146 is connected by a pair of leads 89 and 99 to the 0 and 1 outputs respectively, of the bistable circuit 150.

Each magnetic island 141 or 149 may represent or store a binary digit. If an island is magnetized in a given direction it represents a binary 1; if magnetized in the opposite direction it represents a binary 0. Thus, each group of magnetic islands 141 or 149 may represent or store a binary number or "word." For simplicity of illustration, only six islands are shown in each group, although it is to be understood that in practice a greater number of islands may be used. For example satisfactory results have been attained using as many as thirty-five islands in each group on a disc six inches in diameter.

When a magnetic island is sensed or read by the reading transducer 80, whether the island is magnetized to represent a binary 0 or a binary 1, the trigger circuit 150 assumes a corresponding state of operation which causes the writing transducer to rewrite the representation of the sensed binary digit as fully described in the above-mentioned application. Tranducers 80 and 83 are normally disposed diametrically opposite each other relative to disc 140; therefore, the value 0 to 1 that is read from an island in one group is written on the corresponding island of the other group. As disc 140 rotates all of the digits of a word contained in one group of islands are sequentially read by the reading transducer 80 and through the action of trigger circuit 150 are rewritten by the writing transducer 83 into the corresponding islands of the diametrically disposed group. Thus, each group 141 and 149 normally contains the same binary word, and this word is continually recirculated from one group to the other.

New information can be entered into the recirculation memory through an input terminal 131 to the 0 side, or through an input terminal 132 to the 1 side of trigger circuit 150. A positive input pulse applied to terminal 131 causes the 0 side to conduct; hence, a representation of 0 is written into an island of disc 140 by transducer 83. Similarly, a positive pulse applied to terminal 132 causes the 1 side of trigger circuit 150 to conduct, and a representation of a 1 to be written into an island of disc 140. A symmetrical input terminal 130 is also provided. A negative input pulse applied to terminal 130 causes trigger circuit 150 to change from one state of conduction to the other. The pulses applied to the input terminals must, of course, be of sufficient magnitude to override the signals from the reading transducer. Any convenient timing method that is appropriate to synchonize the input pulses with the rotation of the memory disc may be provided along with a suitable entry register. Since they form no part of the present invention they are not shown in the accompanying drawings.

Figure 6:
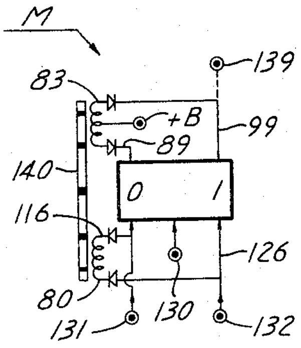
Fig. 6 is a block representation of a recirculation memory as used in the present invention.

A block representation of a recirculation memory M is shown in Fig. 6. Terminals 131 and 132 are the reset and set input terminals, respectively, and terminal 130 is the symmetrical input. A control terminal 139 may be connected to an arming terminal of a gate. A gate thus connected is armed when the memory trigger is conducting on the 1 side and is closed when the memory trigger is conducting on the 0 side.

*Time intervals*

As an aid in explaining the operation of an arithmetic organ comprising several recirculation memory units, certain time intervals associated with the rotation of each memory disc will be defined.

Figure 7:
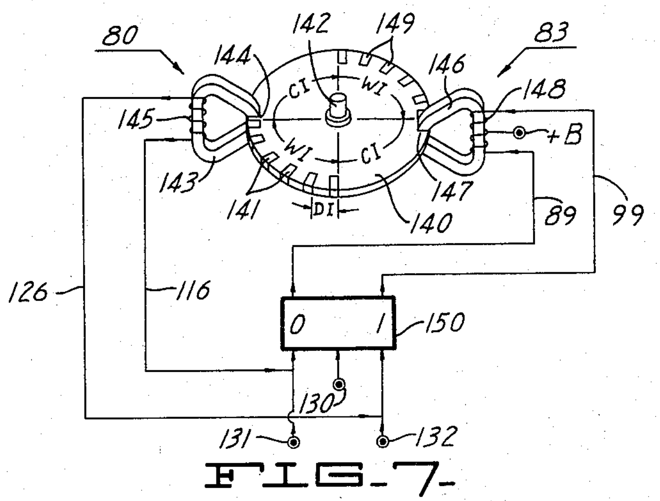
Fig. 7 is an illustration of a recirculation memory showing the reading and writing transducers and the rotating disc with its magnetic memory island.

The time interval of rotation between successive magnetic islands is represented by an arc DI on the disc 140 (Fig. 7). This time interval is called a "digit interval" since during this interval one digit is read by the reading transducer and is then rewritten by the writing transducer.

The time interval required for the transfer of a word from one group of islands to the other group of islands is designated a "word interval." This interval is represented by arcs WI and is substantially the sum of the digit intervals of a group of magnetic islands.

A certain time interval is reserved for the purpose of co-ordinating a memory unit with other units of a computer. For instance, inter-register transfer can be effected, or synchronizing signals can be transmitted during this interval. This time interval is designated a "control interval" and is represented by arcs CI of disc 140. A control interval occurs between each two word intervals; thus there are two control intervals during each rotation of any memory disc.

ARITHMETIC UNIT

*General description*

The arithmetic unit embodying the present invention includes three recirculation memories which may be of the general type shown in Figs. 6–8, and which are identified hereinafter as the "accumulator" memory, the "entry" memory, and the "multiplier" memory. Augends and minuends are entered into the accumulator memory; addends, subtrahends and multiplicands are entered into the entry memory; and multipliers are entered into the multiplier memory. After entry of two operands into the appropriate memories, the desired type of arithmetic operation is selected and the selected operation is then initiated.

During addition or subtraction, the accumulator memory and entry memory cooperate with a timing circuit, a carry circuit, and a control circuit for additively or subtractively combining operands, and each sum or difference is stored in the accumulator memory. During multiplication, the entry and multiplier memories cooperate with the timing, carry and control circuits to form successive partial products of operands, and the partial products are accumulated and stored in the accumulator memory.

During the first word interval following initiation of addition or subtraction, the successively higher order digits of one operand are combined with ordinally corresponding digits of the other operand. Each additive or subtractive combination of a pair of ordinally corresponding digits occurs during a single digit interval, and any stored carry from a previous order is combined with the two operand digits during the same digit interval. The three possible digits that may be combined during a digit interval, i.e., two operand digits and a carry digit, are accumulated serially during the digit interval. First, the augend or minuend digit is registered; then a carry digit, if one exists, is combined therewith to form a partial sum or difference; finally, the addend or subtrahend digit is combined with the partial sum or difference to produce a total ordinal sum or difference, and any new carry digit is stored.

The addition or subtraction operation continues throughout a number of digit intervals equal to the number of orders in a word that can be stored in a recirculation memory. The present invention is illustrated by a six-order system in which each group of islands on a memory disc 140 (Fig. 7) comprises six islands, although it will be obvious that the invention is not limited to this small number of orders.

Since the accumulator memory is adapted to store only a six-order word in the illustrated embodiment, multiplication is confined to a six-order product; therefore, the illustrated multiplication circuit is adapted to combine two three-order factors. The multiplicand word is entered into the three highest orders of the entry memory and the multiplier word is entered into the three lowest orders of the multiplier memory. During the first word interval following initiation of multiplication, the lowest-order digit of the multiplier is sensed, and if it is a 1, it causes entry of the entire multiplicand word into the accumulator memory to form a first partial product. If the lowest-order multiplier digit is a 0, the multiplicand is not entered, and the first partial product comprises all 0's.

During multiplication, each word that is written into the accumulator or multiplier memories is shifted one order to the "right," as written in ordinary notation. In the absence of this shifting operation, the first partial product would be entered into the three highest orders of the accumulator memory, because the multiplicand is stored in the three highest orders of the entry memory, as previously mentioned. However, the shifting operation causes this partial product to be entered into the second-, third- and fourth-highest orders of the accumulator memory in preparation for combining it with a next partial product in proper ordinal alignment.

The right-shifting of the multiplier causes the lowest-order multiplier digit to be lost, and the second-lowest-order multiplier digit to be sensed during the second word interval for controlling entry or non-entry of the multiplicand into the accumulator memory as a second partial product, where it is combined with the shifted first partial product. The above process occurs during each of three consecutive word intervals, after which the multiplication is completed and the total product is stored in the accumulator memory.

*Recirculation memories*

Referring to Fig. 9, the accumulator, entry and multiplier memories are designated M*a*, M*e*, and M*r*, respectively. Memory M*e* is of the type shown in Figs. 6–8, while memories M*a* and M*r* are of that same general type with a modification which is provided to facilitate a single order of right shift during the transfer of a word from one group of islands to another on the same disc during each word interval of multiplication.

Each memory M*a* and M*r* is provided with an additional writing transducer 85 (identified with the accumulator or multiplier memory by the suffix "*a*" or "*r*," respectively), hereinafter designated a "shifting" transducer, which is disposed in cooperative relation with the corresponding memory disc 140, but advanced from the normal writing transducer 83 by one digit interval of arc in the direction of rotation of the disc. If transducer 83 is enabled and transducer 85 is disabled, a word that is stored on the disc is recirculated in unchanging ordinal position. On the other hand, if transducers 83 is disabled and transducer 85 is enabled, the stored word is shifted one order to the right each time it is read and rewritten.

Each transducer 83 or 85 is selectively enabled by connecting the center-tap of its coil to a power source +B, the arrangement being such that one and only one transducer 83 or 85 in each memory M*a* and M*r* is enabled during each word interval of any arithmetic operation. The means by which +B power is supplied to one or the other transducer 83 or 85 comprises a switch S2 in memory M*a* and a switch S4 in memory M*r*. The operations of switches S2 and S4 are alike, and only the former will be described.

Switch S2 is a three-position switch, having an "Off" position, an "Add-Subtract" position, and a "Multiply" position. In its "Off" and "Add-Subtract" positions, switch S2 applies +B power to the writing transducer **83*a* directly through a lead 154*a*, and a recirculating word is not shifted. When switch S2 is in its "Multiply" position, it applies +B power to the writing transducer 83*a* until multiplication is initiated; then it applies +B power to the shifting transducer 85*a* until the multiplication is completed. +B is connected through a lead 157*a* to a brush 156*a* which normally rests on a conducting segment 189*a* of a control disc C1. Disc C1 is keyed to a normally motionless shaft 180 and is rotated when shaft 180 is rotated, as hereinafter described. When disc C1 is at rest, a circuit is completed from brush 156*a* through segment 189*a*, a conducting ring 196*a* that is electrically connected to segment 189*a*, a brush 151*a* that rides on ring 196*a*, a lead 158*a* and lead 154*a* to apply +B power to transducer 83*a*** when the foregoing circuit is completed, a recirculating word is not shifted.

When switch S2 is set to its "Multiply" position, +B is also connected through a lead **159*a* to a brush 153*a* that rides on a conducting ring 197*a*. The latter ring is secured to a control disc C2 which is also keyed to shaft 180 for rotation therewith. Ring 197*a* is electrically connected to a conducting segment 199*a* of disc C2, segment 199*a* being normally disconnected from a brush 152*a* which normally rests on an insulating segment 198*a* of the disc C2. Brush 152*a* is connected by a lead 155*a* to the center tap of the coil of the shifting transducer 85*a***.

When shaft 180 is rotated, as hereinafter described, brush **156*a* contacts an insulating segment 188*a* of disc C1, thereby disconnecting +B from the writing transducer 83*a*, and brush 152*a*, at substantially the same instant, contacts the conducting segment 199*a*, thereby applying +B power to the shifting transducer 85*a*. During the rotation of shaft 180 and its discs C1 and C2, therefore, the shifting transducer is enabled and the writing transducer 83*a* is disabled, and the stored word is shifted one order to the right each time it is read and rewritten. It is to be noted that a pair of diodes are placed in series with each writing transducer 83 and 85**. These diodes serve to decouple the writing transducers from one another for otherwise the unenergized half of the selected transducer and both halves of the unselected transducer in series would form a parallel circuit with the energized half of the selected writing transducer.

It will be seen that +B power is not applied to shifting transducer **85*a* during addition or subtraction, when switch S2 is in its "Add-Subtract" position, and that the disconnecting operation of disc C1 does not remove +B power from transducer 83*a* during addition or subtraction, because power is applied directly to that transducer through the "Add-Subtract" terminal of switch S2**.

Memory discs **140*a*, 140*e*, and 140*r* are all keyed to a constantly rotating shaft 142** for rotation therewith, and their groups of islands are so aligned with respect to their associated transducers that each word interval of one memory is substantially concurrent with a word interval of the other two memories; similarly, control intervals are substantially concurrent throughout the three memories.

The drive mechanism for shaft 180 operates in such manner that rotation of that shaft, and of control discs C1 and C2 begins during a control interval, as hereinafter described. Shaft 180 is driven through one complete rotation and then stopped. The gear ratios for driving shafts 142 and 180 are such that shaft 142 makes one and one half rotations for each complete rotation of shaft 180; therefore, a rotation of shaft 180 embraces three control intervals and three word intervals, beginning and ending within a control interval. The three word intervals are provided for a complete multiplication operation in the three-order system herein illustrated, and would be altered to extend throughout a multiplication operation of any number of orders.

The means for continuously driving shaft 142 comprises a suitable motor (not shown). The same motor may be used for driving shaft 180 through suitable gearing (not shown) and a one-cycle clutch 181 which is constantly driven by the motor. Clutch 181 may be of the type shown in Fig. 3 of U.S. Patent No. 2,162,238, issued June 13, 1939, to H. T. Avery et al., reference being made to the Avery patent for a full description of the clutch. The clutch disclosed in the Avery patent should be modified by providing only one tooth 183 on its ratchet, thereby permitting the clutch to engage only when its ratchet is in full cyclic position (during a control interval). Clutch 181 is engaged by depressing a key 182 which has an arm 191 with a yieldable tip 192 overlying an ear 193 on a bellcrank 185. Depression of key 182 rocks bellcrank 185 clockwise about a fixed shaft 186 for moving a pawl end 187 of the bellcrank to its clutch-engaging position. Bellcrank 185 is spring urged counter-clockwise to restore pawl 187 to its clutch-disengaging position, but can do so only after the clutch has driven shaft 180 through one complete rotation.

Key 182 is also spring urged to its upward position. During the depression of this key, the yieldable tip 192 in its arms 191 releases ear 193 on bellcrank 185 when the bellcrank engages a stop member 194; therefore, pawl 187 disengages clutch 181 after one rotation of shaft 180, even if key 182 remains depressed for more than one rotation of that shaft. Key 182 should be fully depressed against a stop member 195 to insure the release of the bellcrank ear 193 by tip 192 of arm 191 on the key.

Switch S4 cooperates with a pair of control discs C5 and C6, which are keyed to shaft 180 for rotation therewith, to apply +B power to transducers 83*r* and 85*r* of the multiplier memory. The operation of switch S4 and its related circuitry is the same as the previously-described operation of switch S2 and its related circuitry in the accumulator memory. Therefore, during multiplication, the multiplier word standing in memory M*r* is shifted one order to the right during each word interval, along with the accumulated partial product in memory M*a*.

*Addition*

It is recalled that in addition operations the accumulator memory M*a* additively combines two operand digits and a carry digit during each digit interval of a single word interval. The following table illustrates the eight possible combinations of digits that can be added during a digit interval:

| | I | II | III | IV | V | VI | VII | VIII |
|---|---|---|---|---|---|---|---|---|
| Carry | 0 | 0 | 0 | 0 | 1 | 1 | 1 | 1 |
| Augend | 0 | 1 | 0 | 1 | 0 | 1 | 0 | 1 |
| Addend | 0 | 0 | 1 | 1 | 0 | 0 | 1 | 1 |
| Sum | 00 | 01 | 01 | 10 | 01 | 10 | 10 | 11 |

The memory trigger 150*a* receives representations of the three digits, seriatim, during each digit interval, as hereinafter described, and its final state at the end of the digit interval represents the lower-order digit of the binary sum of the three digits, as shown in the foregoing table.

A carry trigger T1 cooperates with memory M*a* to store any carry digit of 1 that occurs during a digit interval, i.e., the state of trigger T1 at the end of a digit interval represents the higher-order digit of the sum of the three additively combined digits. If trigger T1 stands at 0, it represents a carry digit of 0 (generally designated as the absence of a carry digit); if trigger T1 stands at 1, it represents the presence of a stored carry digit of 1. Trigger T1 also controls entry of any stored carry digit into memory M*a* during the next consecutive digit interval.

During a digit interval, the augend digit is first entered into memory trigger 150*a* from disc 140*a* through reading transducer 80*a*, in the manner hereinbefore described; if the oridinal augend digit is a 0, trigger 50*a* is reset to 0 through its reset input, and if the digit is a 1, trigger 150*a* is set to 1 through its set input. Following entry of the augend digit, any stored carry digit of 1 is entered into the symmetrical input of trigger 150*a*, thereby reversing the state of that trigger to represent an increase of unity in the value represented by the state of trigger 150*a*. The following means are provided for entering a stored carry digit of 1 into trigger 150*a*.

A clock pulse generator 208 is illustrated in Fig. 9 as comprising a nonmagnetic disc 209 that is keyed to the memory-disc shaft 142 for continuous rotation therewith. Two groups of permanently magnetized islands 210 are embedded in the periphery of disc 209 and cooperate with a reading transducer, shown schematically at 211 for generating a clock pulse each time an island 210 rotates past transducer 211. In the illustrated arithmetic unit, there are six islands 210 in each group, corresponding to the six islands 141 and 149 (Fig. 7) in each group on a memory disc 140. The islands 210 (Fig. 9) are so arranged relative to shaft 142 and memory discs 140*a*, 140*e* and 140*r* that a clock pulse is generated substantially at the beginning of each digit interval during each word interval, and no clock pulses are generated during any control interval.

The output of transducer 211 is connected by a lead 212 to the input of a carry sensing gate G1 that is armed by the 1 side of the carry trigger T1. The output of gate G1 is connected by a pair of leads 213 and 215 to the reset input of trigger T1. Each clock pulse interrogates gate G1 to sense for a carry digit of 1. If such a carry digit is stored in trigger T1, gate G1 is armed, and the clock pulse is transmitted through gate G1 and leads 213 and 215 to reset trigger T1 to 0, thereby cancelling the stored carry digit of 1.

The output of gate G1 also is connected through lead 213, a delay line D1, a lead 217, a lead 221, a lead 223, a delay line D3, and a lead 224, to the symmetrical input of the accumulator memory trigger 150*a* for reversing the state of that trigger in response to the sensing of a carry digit of 1 at gate G1. Delay line D1 is provided for delaying entry of the carry digit into trigger 150*a* until after the augend digit has been entered from disc 140*a* in the manner previously described. Delay line D3 further delays carry entry, but has an additional purpose that will be explained hereinafter.

The output of delay line D1 also is connected through lead 217 to the input of a carry control gate G2 that is armed, during addition, by the 1 side of the accumulator memory trigger 150*a* through a control lead 230, a switch S1 and a control lead 216. Switch S1 is a three-position switch that is set to an "Add-Multiply" position prior to the initiation of an addition operation. The output of gate G2 is connected by a lead 219 to either the set or the symmetrical input of carry trigger T1. If trigger 150*a* stands at 1 when gate G2 is interrogated by the output pulse from delay line D1 (representing a sensed carry digit of 1 in trigger T1), this indicates that the augend digit was a 1 and that, combined with the carry digit of 1, it will form a binary sum of 10, and a new carry must be stored. Therefore, if gate G2 is armed it transmits the interrogating pulse from delay line D1 to either the set or symmetrical input of trigger T1, thereby setting that trigger back to 1 for storing a new carry digit of 1.

It will be noted that delay line D1 permits trigger T1 to be fully set to 0 through lead 215 before the set pulse is applied through lead 219. Delay line D1 also permits trigger 150*a* to be fully set to 1 by the augend digit for arming gate G2 before the carry pulse is applied to gate G2. Delay line D3 further delays entry of the carry digit, thereby insuring that the condition of gate G2, at the time it is interrogated, is determined entirely by the augend digit, i.e., that the carry digit has not been entered into trigger 150*a* at this time.

After a carry digit of 1, if such occurs, has been entered into the accumulator trigger 150*a*, the corresponding ordinal addend digit is entered into that trigger under joint control of the entry memory M*e* and the clock pulse generator 208. An addend digit of 1 is represented by a pulse applied to the symmetrical input of trigger 150*a*, and an addend digit of 0 is represented by the absence of an input to that trigger.

Each ordinal clock pulse that is generated by clock pulse generator 208 is applied not only to the input of the carry sensing gate G1, but also is transmitted through lead 212, a lead 225, and a delay line D2 to the input of multiplier gate G3 that is armed throughout the word interval of an addition operation by means hereinafter described. The output of gate G3 is connected to the input of an addend-multiplicand gate G4 that is armed by the 1 side of the entry memory trigger 150*e*. The output of gate G4 is connected through the previously described lead 223, delay line D3, and lead 224 to the symmetrical input of the accumulator trigger 150*a*.

It is recalled that an input pulse to trigger 150*a* representing a carry digit of 1 is transmitted through delay lines D1 and D3 in series. Similarly, an input pulse to trigger 150*a* representing an addend digit of 1 is transmitted through delay lines D2 and D3 in series. In order to cause any addend digit of 1 to be entered into trigger 150*a* after entry of any stored carry digit of 1, delay line D2 has a characteristic delay time greater than that of delay line D1. Thus, after entry of the augend and carry digits, any addend digit of 1, represented by a pulse from clock pulse generator 208 transmitted through leads 212 and 225, delay line D2, gate G3, gate G4 (which is armed by trigger 150*e* if and only if the ordinal addend digit is a 1), lead 223, delay line D3, the lead 224, is entered into the symmetrical input of trigger 150*a*, thereby reversing the state of that trigger to represent an increase of 1 in the ordinal sum.

The output of gate G4 is connected not only to the input of delay line D3, but also is connected by leads 223, 221, and 217 to the input of the carry control gate G2 which, it is recalled, is armed by the 1 side of trigger 150*a* during addition. The output pulse from gate G4, which represents an addend digit of 1, is therefore transmitted through leads 223, 221, and 217, gate G2 and lead 219 for storing a carry in trigger T1 if trigger 150*a* stands at 1. It will be seen that trigger 150*a* stands at 1, and gate G2 is armed when it is interrogated by a 1-addend pulse from gate G4, if either the augend digit or the carry digit was a 1. In such case, the further addend digit of 1 produces the binary sum 10, which requires that a carry be stored for entry into the next higher order. If neither the augend nor the carry digit was a 1, trigger 150*a* stands at 0, gate G2 is closed, and no further carry digit is stored in trigger T1. If both the augend and carry digits were 1's, a carry digit was already stored by a pulse transmitted from delay line D1 through gate G2 in the manner hereinbefore described; in this case, trigger 150*a* stands at 0, representing the lower-order digit of the partial binary sum 10, gate G2 is closed, and no further carry storage pulse is transmitted through lead 219 to trigger T1.

The presence of delay line D3 between lead 224 and the junction of leads 223 and 221 delays entry of a 1-addend pulse into trigger 150*a* until gate G2 is sensed; therefore, the condition of gate G2, when it is sensed by a 1-addend pulse, is determined exclusively by the combined values of the augend and carry digits. For this purpose, delay line D3 may be eliminated if the inherent switching time of trigger 150*a* is sufficiently long to permit gate G2 to be sensed by a 1-addend pulse before trigger 150*a* is reversed by the same pulse to thereby reverse the condition of gate G2.

The previously-mentioned multiplier gate G3, through which each clock pulse must pass before interrogating the addend-multiplicand gate G4, is armed, during addition, through a control lead 204, a three-position switch S3 that is set to an "Add-Subtract" position for addition, a control lead 222, and a brush 161 that rides on a conducting ring 162. Ring 162 is secured to a control disc C3 that is keyed to the previously-described shaft 180 for rotation therewith. Disc C3 comprises a single conducting segment 163 and an insulating segment 165. The conducting segment 163 subtends an angle corresponding to one word interval. A brush 164 rides on the periphery of disc C3, and is connected to a source +C of gate-arming potential. When brush 164 engages conducting segment 163, +C potential is applied to the arming input of gate G3 through the circuit described above, including switch S3. When clutch 181 stands disengaged, i.e., in its normal, or rest condition, control disc C3 is in such position that brush 164 rests upon insulating segment 165 and gate G3 is closed. Therefore, clock pulses from the continuously-rotating disc 209 are normally blocked by gate G3. When addition is initiated by engaging clutch 181 during a control interval, as hereinbefore described, control disc C3 rotates to bring conducting segment 163 under brush 164 approximately at the beginning of the next word interval, and brush 164 remains in contact with segment 163 during and only during that word interval; therefore the gate-arming potential +C is applied to gate G3 for arming that gate during the first word interval following the initiation of addition.

Due to the requirements of a multiplication operation, hereinafter described, three word intervals (and three control intervals) occur while shaft 180 makes one complete rotation under the control of clutch 181. Since only one word interval is required for addition or subtraction, the two final word intervals, as well as two control intervals of an addition or subtraction operation are idle. It will be obvious that a separate one-cycle clutch could be provided to turn a control disc such as C3 during only one word interval (and a corresponding control interval). However, the rotation of shaft 180 can be quite rapid, and the cost of an extra clutch would be greater, for most purposes, than the cost in time of permitting two idle word intervals and two idle control intervals to occur during addition or subtraction.

The need for closing gate G3 at all times except during an arithmetic operation can be eliminated by keying two clock pulse generator discs, similar to disc 209, to shaft 180 instead of to the constantly-rotating shaft 142. In such case, one generator would be selected, by a switch similar to switch S2, for operation during addition and subtraction, and would have only one series of islands corresponding to the single word interval of addition or subtraction. The second generator would be selected for operation during multiplication, and would have a series of islands corresponding to each word interval of multiplication. With this arrangement, clock pulses are generated only during rotation of shaft 180, and need not be blocked at other times. However, it should be noted that for an accumulator having "*n*" orders, the multiplication clock pulse disc on shaft 180 would need a series of "*n*" islands in each of "*n*" word interval segments, the latter being separated from each other by "*n*" control interval segments. For the six-order accumulator illustrated, such a clock pulse generator would be entirely practical, but for a twenty-order accumulator, as provided on many calculating machines, $20\times20=400$ islands would have to be compressed into half the periphery of a disc (there are no islands in the control interval segments). The equivalent of this arrangement may be achieved by the use of a continuous medium rather than discrete islands, but the signal amplitude from such a medium is relatively low and generally requires additional amplification. However, by eliminating the need for blocking clock pulses, source +C can be connected directly to control lead 222, and control disc C3 can be entirely eliminated along with a companion control disc C4 which is employed for a similar purpose during multiplication, as described hereinafter.

Summarizing the addition operation, during each digit interval of the single word interval of addition, the appropriate set of ordinally-corresponding augend, carry and addend digits are added, in the sequence named, by first setting the accumulator trigger 150*a* to a condition representing the value of the augend digit, and then reversing the state of that trigger in response to the occurrence of each digit 1 in the corresponding order of the carry and the addend. A carry digit of 1 from the next lower order is stored in trigger T1. This carry digit is sensed at gate G1 by an ordinally-corresponding clock pulse from clock pulse generator 208, and is then entered into trigger 150*a*. The sensing of a stored carry causes that carry to be cancelled. An addend digit of 1 is sensed at gate G4 which is controlled by the corresponding order of the entry memory M*e*, and is then entered into trigger 150*a*. Any combination of two ordinally corresponding digits 1 is sensed at gate G2 and causes a new carry digit of 1 to be stored in trigger T1 for entry into the next higher order of the accumulator memory M*a*. As each ordinal sum digit is formed in trigger 150*a*, it is recorded in memory disc 140*a*, which therefore contains the entire sum at the end of one word interval. At this time the carry and addend entry circuits are disabled and the sum is recirculated in memory M*a* for readout, or for use as a further operand.

*Subtraction*

In preparing for subtraction, the minuend is entered into memory M*a* and the subtrahend into memory M*e*. Subtraction is performed in the illustrated machine exactly as addition is performed, except that switch S1 is set to a "Subtract" position prior to initiating the operation. With switch S1 in its "Subtract" position, the carry control gate G2 is armed by the 0 side of trigger 150*a* through a control lead 231, switch S1, and control lead 216. With this arming circuit completed, gate G2 causes a carry digit of −1 to be stored in trigger T1 if trigger 150*a* stands at 0 when gate G2 is interrogated by a pulse either from the output of gate G1 (representing a previously stored carry digit of −1), or from the output of gate G4 (representing entry of a subtrahend digit of −1).

During the first word interval following initiation of subtraction, the successive ordinal digits of the subtrahend are subtracted from corresponding orders of the minuend by the process hereinbefore described, except that a carry is stored, during subtraction, when a digit −1 is combined with a 0. At the end of the word interval, the difference word stands in memory M*a*, and is thereafter recirculated for readout or for use as a subsequent operand.

*Multiplication*

In preparation for multiplying in the present machine the multiplicand word is entered into the three highest orders of memory M*e* and the multiplier word is entered into the three lowest orders of memory M*r*. Also, switch S1 is set to its "Add-Multiply" position, and switches S2–S4, which may conveniently be ganged, are set to their respective "Multiply" positions. Multiplication is then initiated by depressing key 182 to engage clutch 181 for rotating shaft 180.

The multiplication operation continues throughout a number of word intervals equal to the number of multiplier orders, i.e., three word intervals in the illustrated embodiment of the invention. During the first word interval, the lowest-order digit of the multiplier is sensed; if this digit is a 1, the entire multiplicand word is entered into the accumulator memory M*a* as a first partial product during the first three digit intervals of that word interval. If the lowest-order multiplier digit is a 0, a 0 is effectively entered into memory M*a* during each of the first three digit intervals.

Each digit that is recorded on an island of the accumulator memory during multiplication is written by the shifting transducer 85*a*. Therefore, the digits of the multiplicand word, or a series of three 0's, depending on the value of the lowest-order multiplier digit, are written in the second-, third- and fourth-highest-order islands on disc 140*a* during the first word interval, thereby shifting the first partial product one order to the right. Similarly, the recirculated multiplier word is rewritten by the multiplier shifting transducer 85*r* to thereby shift the multiplier word one order to the right during each word interval. Thus, both the partial product and multiplier words are shifted one order to the right during each word interval, and successively higher-order multiplier digits control entry or non-entry of the multiplicand into memory M*a* during successive word intervals; each new entry is combined with the shifted and accumulated previous entries to form a new partial product. At the end of the third word interval, in the illustrated embodiment of the invention, the total product of six orders stands in the accumulator memory M*a*.

Each ordinal multiplication process is performed by the operation of the clock pulse generator 208 in cooperation with the previously-described carry circuitry, the multiplier gate G, the addend-multiplicand gate G4, and the accumulator trigger 150*a*. During each word interval of multiplication, six clock pulses are applied in sequence to the input of gate G3, which is armed throughout that word interval if and only if the corresponding digit of the multiplier word is a 1. The means for arming gate G3 during multiplication will be described hereinafter. Assuming for the present that gate G3 is armed, thereby indicating that the multiplicand word is to be entered into memory M*a* as a partial product during the current word interval, all six clock pulses that occur during the word interval are transmitted through gate G3 to the input of gate G4. The latter gate is controlled by the 1 side of trigger 150*e*, as previously described; therefore, it produces an input pulse during each digit interval in which a multiplicand digit of 1 is read by transducer 80*e*, and this output pulse is transmitted to the symmetrical input of trigger 150*a* to therein be additively combined with the ordinally-corresponding digit of any previously-accumulated partial product. If gate G3 is closed (because of a 0 multiplier digit), no clock pulses are applied to gate G4, and a partial product of all 0's is entered into memory M*a* during the current word interval.

Prior to the initiation of multiplication, switch S1 is set to its "Add-Multiply" position, thereby controlling gate G1 from the 1 side of trigger 150*a* for producing additive carries. Thus, carries which result from the addition of previously-accumulated partial products and a currently-entered partial product are sensed, added and stored in the manner previously described in relation to the addition operation. In multiplication, an output pulse from gate G4, for sensing the carry control gate G2, represents a partial-product digit rather than an addend digit, but the carry operations are nevertheless the same as those previously described.

The multiplier gate G3 is armed through control lead 204, switch S3 which is set to its "Multiply" position prior to the initiation of multiplication, a control lead 241 and a brush 171 that rides on a conducting ring 172. The latter ring is secured to the previously-mentioned control disc C4, which is keyed to shaft 180 for rotation therewith.

Disc C4 is provided with a plurality of conducting segments 173 that are evenly spaced by an equal number of insulating segments 175. The number of conducting segments corresponds to the number of word intervals of a multiplication operation, which, in turn, corresponds to the number of orders in the multiplier word. In the illustrated embodiment of the invention, the three-order multiplier word requires that there be three conducting segments 173 (and three insulating segments 175). A brush 174 rides on the periphery of disc C4 and rests on an insulating segment 175 when shaft 180 is stopped, i.e., when clutch 181 stands disengaged. When clutch 181 is engaged to initiate multiplication, disc C4 rotates to bring a conducting segment 173 into contact with brush 174 at substantially the beginning of the next word interval. The positions of segments 173 and 175 relative to brush 174, and the angles subtended by these segments are such that brush 174 contacts a conducting segment 173 during and only during each of the three word intervals of multiplication.

Brush 174 is connected by a control lead 252 to the 1 side control output terminal of a multiplier storage trigger T2. The latter trigger is adapted to be reset to 0, as hereinafter described, during each control interval, and to be set to 1 just prior to the beginning of the next word interval if and only if the lowest-order digit of the multiplier word in memory M*r* is a 1. When trigger T2 is set to 1, it remains in that condition during the next word interval, and arms the multiplier gate G3 throughout that word interval, by means of the above-described circuit including disc C4 and switch S3. If the lowest-order digit of the multiplier word is a 0, trigger T2 is merely reset to 0, gate G3 remains closed throughout the next word interval. The operation of gate G3 in performing ordinal multiplication operations has been described previously. The following circuit is employed for controlling the state of trigger T2.

A control pulse generator 235 is employed for generating a control pulse during each control interval. Generator 235 is illustrated in Fig. 9 as comprising a non-magnetic disc 236 keyed to the continuously-rotating shaft 142 for rotation therewith. It is recalled that shaft 142 makes one complete rotation during each two word interval. Therefore, a pair of diametrically-opposed magnetic islands 237 are located on the periphery of disc 236 and cooperate with a reading transducer shown generally at 238 to generate an output pulse each time an island 237 rotates past transducer 238. The positions of islands 237 relative to transducer 238 are such that a control pulse is generated during each control interval.

The output of transducer 238 is connected by a pair of leads 240 and 242 to the reset input of trigger T2; therefore, each control pulse resets that trigger to 0. The output of transducer 238 also is connected through lead 240, a delay line D4 and a lead 244 to the input of a gate G5 that is controlled, through a control lead 250, by the 1 side of trigger **150*r*. The delay characteristic of delay line D4 is such that gate G5 is interrogated by each control pulse after trigger 150*r*** has been set or reset by the lowest-order multiplier digit. If this digit is a 0, gate G5 is closed and trigger T2 remains reset to 0, thereby causing gate G3 to remain closed during the current word interval. If the lowest-order multiplier digit is a 1, gate G5 is armed when it is interrogated by the control pulse, and trigger T2 is set to 1, thereby arming gate G3 during that word interval.

Since the multiplier word is originally entered into the three lowest orders of memory M*r*, and since the multiplier word in that memory is shifted one order to the right during each word interval of multiplication, each successively higher-order multiplier digit becomes the "lowest-order" multiplier digit in turn, and controls the state of trigger T2 during one word interval. After three word intervals of multiplication, the one-cycle clutch 181 automatically disengages and shaft 180 comes to rest. The total product stands in the six orders of memory M*a* at this time, and continues to recirculate without further shifting, for readout or for use as a subsequent operand.

I claim:

1. In a recirculation memory, the combination of: a cyclically moving magnetizable medium having successive areas thereon magnetized to represent an ordinally-arranged binary word; a digit representing device adapted to assume either of two distinct states representative of the binary digits 0 and 1 respectively, said device having a first terminal for drawing current when said device is in its 1-representing state and having a second terminal for drawing a current when said device is in its 0-representing state; a reading transducer adjacent said medium for detecting seriatim the digits of said word; a passive connection from the reading transducer to said device for setting said device to represent a detected digit; a first writing transducer adjacent said medium and spaced from said reading transducer by a number of ordinal increments at least equal to the number of digits of said word, said first writing transducer having a centertapped winding and having the ends of its winding connected through a passive circuit to said first and second terminals; a second writing transducer adjacent said medium and spaced from said first writing transducer by a predetermined number of ordinal increments, said second writing transducer having a centertapped winding and having the ends of its winding connected through a passive circuit to said first and second terminals; a power source for said device; first and second cyclically operable power control discs having complementary conducting and non-conducting segments; means including said first disc for initially connecting said power source to the centertap of said first writing transducer; means for driving said discs through single cycles of rotation; and means including said second disc for connecting said power source to the centertap of said second writing transducer for a predetermined interval of each cycle.

2. In a circuit for serially combining first and second binary values: a source of clock pulses; an accumulating device operable to maintain either of two stable conditions and having an input and a control terminal; means for applying a pulse train representative of said first binary value to the input of said accumulating device; a carry storage device having an input and a control terminal; a first delay circuit; a first gating means having an input connected to the pulse source and having an arming terminal connected to the control terminal of said carry storage device and an output connected to the input of said first delay circuit and to the input of said carry storage means; a second gating means having an input connected to the output of said first delay circuit and an output connected to the input of said carry storage means and having an arming terminal; means connecting the control terminal of said accumulating device to the arming terminal of said second gate for applying an arming potential to said gate when said device is in a predetermined condition; a second delay circuit having an input connected to said pulse source; third gating means having an input connected to the output of said second delay circuit; means connecting the output of said third gating means to the input of said second gating means; a third delay circuit having an input connected to the output of said third gating means and having an output connected to the input of said accumulating device; means connecting the output of said first delay circuit to the input of said third delay circuit; and control means representing the serially occurring second binary value connected for control of said third gating means.

3. In a binary multiplier, the combination of: a clock pulse source; first and second recirculation memories recirculating continuously and synchronously with said clock pulse source and each having an input and each including a continuously moving magnetic medium for storing binary words, a digit representing device, a reading transducer adjacent said medium for detecting the digits of a stored word and for entering a detected digit into said digit representing device, a normally operative first writing transducer energizable by said device for replacing a detected digit in a normal writing location on said medium, and a normally inoperative second writing transducer selectively energizable by said device for replacing a detected digit on said medium in a right-shifted relation to the normal writing location; a third recirculation memory recirculating continuously and synchronously with said clock pulse source and having an input and including a continuously moving magnetic medium for storing binary words, a digit representing device, a reading transducer adjacent the medium for detecting the digits of a stored word and for entering a detected digit into said digit representing device, and a writing transducer energizable by said device for replacing a detected digit in a normal writing location on said medium; means for entering a plural order multiplier word into said second memory; means for entering a plural order multiplicand word into said third memory; gating means connected to said clock pulse source and having first and second arming terminals and having an output connected to the input of said first memory; means for selectively applying an arming potential to said first arming terminal of said gating means in accordance with a first predetermined state of the digit representing device of said third memory and for removing the arming potential to said first arming terminal of said gating means in accordance with a second predetermined state of the digit representing device of said third memory; a manually-depressible key; means operable in response to the depression of said key and including a one cycle clutch for initiating a multiplication; means operable upon engagement of said clutch to disable the normally operative writing transducers of said first and second memories and to substantially simultaneously enable said normally inoperative writing transducers of said first and second memories; means including said first recirculation memory for accumulating successive partial products; and multiplier storage means under control of said second recirculation memory for selectively applying an arming potential to said second arming terminal of said gating means to represent a first predetermined value and for removing the arming potential to represent a second predetermined value throughout each successive word period of a multiplication in accordance with each corresponding successive digit of the multiplier word whereby said gating means is jointly controlled by said multiplier storage means and said third recirculation memory for developing a pulse train at the input of said first recirculation memory representative of a partial product during each successive word period of a multiplication.

4. In a calculating machine having first and second synchronized memories, the combination of: means for entering a plural-order first operand value into said first memory; means for entering a plural-order second operand value into said second memory; an accumulating device coupled to said first memory for cyclically receiving and retransmitting said first operand value and for receiving and accumulating said first and second operand values; a continually operating clock pulse generator having an output; gating means for connecting the output of said clock pulse generator to the input of said accumulating device and having first and second arming terminals and enabled only by the conjoint application of arming potentials to said first and second terminals; means including said second memory for applying an arming potential to said second terminal in accordance with successive orders of said second operand value; a manually depressible key; a source of gate arming potential; a normally inactive control disc including a conducting segment; a first brush for connecting said source to said segment; a second brush for cyclically connecting said segment to said first terminal upon actuation of said disc; a normally disengaged clutch effective upon being engaged to actuate said control disc for one cycle of operation; and means operable in response to depression of said key for engaging said clutch.

5. A multiplying device comprising: accumulating means for adding partial products including a first memory and an associated carry circuit; a second memory for receiving the multiplicand word; a third memory for receiving the multiplier word; a clock pulse source synchronized with the operation of said memories; gating means connecting said source to the input of said accumulating means and having first and second arming terminals; a connection from said second memory to said first arming terminal for applying an arming potential to said first arming terminal when said second memory is in a predetermined state of operation; a multiplier digit storage device controlled by said third memory for storing each successive multiplier digit throughout each corresponding successive word period of a multiplication operation; a normally open control connection from said multiplier digit storage device to said second arming terminal of said gating means; a shaft; operation control means in said control connection including a cyclically operable commutator mounted on said shaft for completing said connection throughout each word period of a multiplication operation; a source of power; a cyclic clutch mounted on said shaft for connecting said shaft to said source of power; and means for releasing said clutch for initiating a multication operation.

6. In a circuit for ordinally combining binary values, the combination of: a first recirculation memory comprising a moving magnetizable medium having a first binary value stored thereon, a first bistable device having a symmetrical input and two asymmetrical inputs, a reading transducer passively connected to said asymmetrical inputs for setting said device to correspond to binary values represented on said medium, and a recording transducer passively connected to the output of said device for recording on said medium values represented by said device; carry storage means under control of said first bistable device for assuming a predetermined condition to represent a stored value; a clock pulse source synchronized with said memories; a first gating means having an input connected to said pulse source and an output connected to the symmetrical input of said first bistable device and controlled by said carry storage means to pass a pulse from said source to the symmetrical input of said first bistable device when said carry storage means is in a condition to represent a carry value for setting said first bistable device to represent the sum of said carry value and said first operand value; a second recirculation memory including a moving magnetizable medium having a second binary value stored thereon, and a second bistable device for recirculating serially the second binary value; a second gating means having an arming terminal and having an input connected to said pulse source and an output connected to the symmetrical input of said first bistable device; and means connecting the output of said second bistable device to the arming terminal of said second gating means for enabling said first gating means to pass a pulse from said pulse source to the symmetrical input of said first bistable device when said second device is in a predetermined condition to set said first device to represent the sum of said first binary value, said carry and said second binary value.

References Cited in the file of this patent

UNITED STATES PATENTS

| | | |
|---|---|---|
| 2,611,813 | Sharpless et al. | Sept. 23, 1952 |
| 2,686,632 | Wilkinson | Aug. 17, 1954 |
| 2,749,037 | Stibitz | June 5, 1956 |
| 2,787,416 | Hansen | Apr. 2, 1957 |
| 2,887,269 | Reisch | May 19, 1959 |
| 2,901,166 | Hamilton et al. | Aug. 25, 1959 |

(Other references on following page)

FOREIGN PATENTS

| | | |
|---|---|---|
| 200,563 | Australia | Dec. 9, 1955 |
| 526,058 | Belgium | Feb. 15, 1954 |
| 1,030,471 | France | Mar. 11, 1953 |
| 1,084,368 | France | July 7, 1954 |
| 727,926 | Great Britain | Dec. 11, 1952 |

OTHER REFERENCES

Thoresen: "Design Features of a Magnetic Drum Memory for the National Bureau of Standards Western Automatic Computer (SWAC)." Proceedings of Electronic Computer Symposium, April 20 to May 2, 1952, at Los Angeles. Pages II–0 to II–9. Pages II–4 and II–7 relied on November 1952.

Richards: "Arithmetic Operations in Digital Computers." Copyright 1955. D. Van Nostrand Co. Inc., pages 151–155.